US011046431B2

United States Patent
Pandit et al.

(10) Patent No.: US 11,046,431 B2
(45) Date of Patent: Jun. 29, 2021

(54) FEEDBACK BASED SMART CLUSTERING MECHANISM FOR UNMANNED AERIAL VEHICLE ASSIGNMENT

(71) Applicant: INTERNATIONAL BUSINESS MACHINES CORPORATION, Armonk, NY (US)

(72) Inventors: Sushain Pandit, Austin, TX (US); Martin Oberhofer, Sindelfingen (DE); Fang Wang, Westford, MA (US); Su Liu, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 274 days.

(21) Appl. No.: 16/171,838

(22) Filed: Oct. 26, 2018

(65) Prior Publication Data

US 2020/0130828 A1 Apr. 30, 2020

(51) Int. Cl.
*B64C 39/02* (2006.01)
*G08G 5/00* (2006.01)

(52) U.S. Cl.
CPC ......... *B64C 39/024* (2013.01); *G08G 5/0043* (2013.01); *G08G 5/0069* (2013.01); *B64C 2201/128* (2013.01)

(58) Field of Classification Search
CPC ............ B64C 39/024; B64C 2201/128; G08G 5/0069; G08G 5/0043; G08G 5/0026; G08G 5/0091; G08G 5/0013; G06Q 10/063; G06Q 50/30

USPC .......................................................... 701/3
See application file for complete search history.

(56) References Cited

U.S. PATENT DOCUMENTS

| 9,354,296 | B2 | 5/2016 | Ubhi et al. |
| 9,792,576 | B1 | 10/2017 | Jamjoon et al. |
| 2014/0277854 | A1 | 9/2014 | Jones et al. |
| 2015/0120346 | A1 | 4/2015 | Byrne et al. |
| 2015/0302858 | A1 | 10/2015 | Hearing et al. |

(Continued)

OTHER PUBLICATIONS

Ferrandez, "Optimization of a Truck-drone in Tandem Delivery Network Using K-means and Genetic Algorithm", Journal of Industrial Engineering and Management, JIEM, 2016, 9(2): 374-388, 15 pages.

(Continued)

*Primary Examiner* — Nadeem Odeh
(74) *Attorney, Agent, or Firm* — William Hartwell; Andrew D. Wright; Roberts Calderon Safran & Cole, P.C.

(57) ABSTRACT

A computer-implemented method includes generating, by a computer device, a plurality of clusters of unmanned aerial vehicles (UAVs) from a plurality of UAVs having different UAV characteristics, the clusters being generated based on the UAV characteristics of each of the UAVs; determining, by the computer device, task characteristics for a first task; selecting, by the computer device, one of the clusters based on the task characteristics of the first task; assigning to the first task, by the computer device, a first UAV of the plurality of UAVs from the selected cluster; receiving, by the computer device, task feedback regarding an attempt by the first UAV to complete the first task; and reassigning, by the computer device, and based on the task feedback, the first UAV to a determined one of the plurality of clusters.

19 Claims, 5 Drawing Sheets

(56) References Cited

U.S. PATENT DOCUMENTS

| | | | | |
|---|---|---|---|---|
| 2015/0317582 | A1* | 11/2015 | Nath | G06Q 10/06311 |
| | | | | 705/7.13 |
| 2016/0247404 | A1* | 8/2016 | Srivastava | G08G 5/0091 |
| 2016/0306355 | A1 | 10/2016 | Gordon et al. | |
| 2016/0357183 | A1* | 12/2016 | Shaw | G05D 1/0027 |
| 2019/0289469 | A1* | 9/2019 | Bentley | G08G 5/0008 |
| 2019/0340569 | A1* | 11/2019 | Prager | B64C 39/024 |

OTHER PUBLICATIONS

Tuyishimire, "Optimal Clustering for Efficient Data Muling in the Internet-of-Things in Motion", https://www.researchgate.net/publication/324081236ab, Mar. 2018, 12 pages.

Alidaee et al., "On the Flexible Demand Assignment Problems: Case of Unmanned Aerial Vehicles", IEEE Transactions on Automation Science and Engineering, vol. 8, No. 4, pp. 865-868, Oct. 2011, 4 pages.

Silva et al., "Semi-supervised clustering using multi-assistant-prototypes to represent each cluster", In Proceedings of the 30th Annual ACM Symposium on Applied Computing (SAC '15), ACM, New York, NY, 831-836, 2015, 6 pages.

AFP Relax News, "The popularity of drones is about to soar to new heights", https://www.yahoo.com/tech/popularity-drones-soar-heights-134224245.html, accessed Oct. 24, 2018, 1 page.

Wydeven, Lawsuits rise as drones gain in popularity, http://www.usatoday.com/story/money/2017/01/14/lawsuits-rise-drones-gain-popularity/95954730/, Jan. 14, 2017, 2 pages.

Anonymous, "Getting Started", https://www.faa.gov/uas/getting_started/, accessed Oct. 24, 2018, 2 pages.

Anonymous, "Classification of the Unmanned Aerial Systems", https://www.e-education.psu.edu/geog892/node/5, accessed Oct. 24, 2018, 6 pages.

Anonymous, "k-means clustering", https://en.wikipedia.org/wiki/K-means_clustering, accessed Oct. 24, 2018, 16 pages.

Anonymous, "xcopterCalc—easy—Multicopter Calculator", https://www.ecalc.ch/xcoptercalc_mobile.php?acalc&lang=en, accessed Oct. 24, 2018, 2 pages.

* cited by examiner

FEEDBACK BASED SMART CLUSTERING MECHANISM FOR UNMANNED AERIAL VEHICLE ASSIGNMENT

BACKGROUND

The present invention relates generally to unmanned aerial vehicle (UAV) management and, more particularly, to the clustering of UAVs in a fleet of UAVs to maximize efficiency of the fleet.

UAVs are becoming increasingly popular with delivery services, other businesses that frequently deliver packages to customers, and other businesses such as photography companies. Some of these UAV users have large fleets of UAVs that are used in the delivery process or in the photographing process.

SUMMARY

In a first aspect of the invention, there is a computer-implemented method including: generating, by a computer device, a plurality of clusters of unmanned aerial vehicles (UAVs) from a plurality of UAVs having different UAV characteristics, the clusters being generated based on the UAV characteristics of each of the UAVs; determining, by the computer device, task characteristics for a first task; selecting, by the computer device, one of the clusters based on the task characteristics of the first task; assigning to the first task, by the computer device, a first UAV of the plurality of UAVs from the selected cluster; receiving, by the computer device, task feedback regarding an attempt by the first UAV to complete the first task; and reassigning, by the computer device, and based on the task feedback, the first UAV to a determined one of the plurality of clusters.

In another aspect of the invention, there is a computer program product, the computer program product including a computer readable storage medium having program instructions embodied therewith, the program instructions executable by a computing device to cause the computing device to: generate a plurality of clusters of unmanned aerial vehicles (UAVs) from a plurality of UAVs, each of the clusters having a set of cluster parameters; determine task characteristics for a first task; select one of the clusters based on the task characteristics of the first task being within the cluster parameters of the selected cluster; assign to the first task a first UAV of the plurality of UAVs from the selected cluster; receive task feedback regarding an attempt by the first UAV to complete the task; and reassign, based on the task feedback, the first UAV to a determined one of the plurality of clusters.

In another aspect of the invention, there is system including a processor, a computer readable memory, and a computer readable storage medium; program instructions to generating, by a computer device, a plurality of original clusters of unmanned aerial vehicles (UAVs) from a plurality of UAVs having different UAV characteristics, the original clusters being generated based on the UAV characteristics of each of the UAVs, each of the original clusters having a set of cluster parameters; program instructions to select one of the original clusters based on task characteristics of a first task being within the cluster parameters of the selected original cluster; program instructions to assign to the first task a first UAV of the plurality of UAVs from the selected original cluster; program instructions to receive task feedback regarding an attempt by the first UAV to complete the task; program instructions to reassigning, based on the task feedback, the first UAV to a determined one of the plurality of clusters; and program instructions to generate a plurality of new clusters of UAVs from the plurality of UAVs. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention relates generally to UAV management and, more particularly, to the management and optimization of a fleet of UAVs used for defined tasks such as delivery or photography. According to aspects of the invention, clusters of UAVs having similar characteristics are generated from a fleet of UAVs in order to optimize the use of the fleet. In embodiments, the performance of a UAV is analyzed after each task by that UAV to refine the characterization of that UAV and, if the characterization warrants, reassign that UAV to a different cluster in the fleet and/or recluster the fleet into a different set of clusters. In this manner, implementations of the invention provide optimization of the fleet of UAVs and simplification of choosing an appropriate UAV because any UAV from the most appropriate cluster can be used for a given task.

Advantageously, embodiments of the invention enable the optimization of a computing system that manages a fleet of UAVs. Thus, aspects of the invention provide improvements to the functioning of a computing system that manages a fleet of UAVs. More specifically, aspects of the invention utilize the unconventional steps of evaluating the results of each task, using that information to generate and/or revise clusters of the UAVs, and use the clustering to simplify the selection of a UAV for a specific task. Thus, a technical solution to the technical problem of optimally using UAV resources to complete tasks in a more efficient manner is provided.

UAV use in both commercial and consumer space has been on the rise. According to some sources, UAV sales are expected to increase tenfold by the end of the decade. With this rapid rise in interest and mainstream adoption, there have been several issues around UAVs conflicting with government (FAA) regulations, privacy guidelines, and less obvious operational constraints. This is especially true for commercial UAV flights, where an individual or a business is using a UAV (or a set of UAVs) for any sort of business-related operation, or even commercial UAV photography or videography.

As an example, according to FAA guidelines, UAVs may be allowed to carry packages, but the combined weight of the UAV and the package cannot exceed 55 pounds. This can pose a challenge for businesses that are wanting to use UAVs for package deliveries because they need to strike a balance between UAV capabilities (often adding to its weight), the size of the package, and the distance to a delivery destination. To deliver a package weighing 30 pounds to a destination that's 50 miles away from the warehouse, the business would want to pick a UAV that's 25 pounds or less but has the right device characteristics for at least a 100 mile+/− error margin flight range. At the same time, the business would not want to use a UAV that weighs under 25 pounds but has a flight range of 500 miles for this scenario, because it's not an optimum "UAV to delivery assignment" (this UAV could be used for another assignment that requires a longer flight). Since every business would have a finite number of UAVs fitting a specific characteristic cluster, it becomes advantageous to assign the right UAVs to the right delivery assignment. This problem can be generalized to any UAV-specific assignment, even though for this disclosure we use UAV package delivery as our specific use case.

Against this background, embodiments of the invention include a method of finding an optimal UAV assignment based on device characteristics and a goal specification such that a set of UAVs can meet a given set of assignments in an optimal fashion. Since no such method can be initially designed with 100% accuracy, embodiments introduce a feedback-based learning mechanism based on whether the assigned UAV met the assignment in a satisfactory manner and use this feedback to improve the method.

Examples of device/UAV characteristics include number of rotors, UAV weight, frame size, rotor orientation (for example, flat or co-axial), battery type, battery charge level, maximum allowable battery discharge percentage, controller type, motor manufacturer type, motor cooling level (for example, excellent/good/medium/poor/very poor), gear ratio, propeller diameter, propeller pitch, and number of blades on the propellers. Examples of goal characteristics that are elements in a goal specification include flight distance and thrust/weight ratio necessary for a given package.

Embodiments include a system to find an optimal UAV assignment from a set of UAVs for a package delivery goal specification, including: defining UAV clusters based on device and goal characteristics using a combination of k-means clustering and supervised learning (this combination is an example of what is referred to as semi-supervised clustering); identifying the right cluster given a new package delivery goal; mapping a new UAV to one of the existing clusters or a new cluster formed after triggering re-clustering; capturing feedback based on whether the assigned UAV met the delivery assignment in a satisfactory manner and using the feedback to refine the clusters; refining the clusters by taking into account frequently visited delivery destinations so that there are more available UAVs for frequently visited paths; and refining the clusters based on frequently occurring weather patterns so that there are more available UAVs for paths with heavy headwind.

Embodiments include a semi-supervised clustering method, where a k-means clustering algorithm is modified to incorporate labelled seed data as well as feedback data. For embodiments that include the UAV package delivery problem, this includes using clustering at the beginning with some labelled data (for example, crafted thru goal approximation tools) when no flight record feedback exists, and later incorporating feedback (once a number of package deliveries have taken place) to continually refine the initial clustering taking into account various factors. Some factors taken into account include feedback from completed UAV flights, frequently visited UAV delivery paths, and weather patterns affecting UAV delivery paths.

An example of semi-supervised clustering includes a combination of k-means clustering and supervised learning to guide the initial clustering process. In some cases, clustering is completely unsupervised, however, given that it is beneficial to have clusters that are goal oriented, a 'guided' component can be added to help ensure that the clusters are representative of the desired goals. For achieving semi-supervised clustering, initial labelled seed data is gathered that maps (even if approximately) a few instances of UAV characteristics to goal characteristics. Initial labelled seed data to guide semi-supervised clustering is prepared by calculating expected flight distance and thrust/weight ratio by considering device characteristics for a subset of UAVs.

Embodiments include a processor that performs semi-supervised clustering using a combination of unlabeled data (just UAV characteristics) and labelled seed data (UAV and goal characteristics) to guide the process. In embodiments, the processor uses a k-means clustering algorithm as follows: for all the UAVs used in the seed data set, the processor sets the 'goal' annotation (expected flight range, thrust/weight ratio) based on the initial seeding step; for the UAVs that were not in the seed data set, the processor follows k-means clustering to associate them with the nearest annotated cluster; and in each step of the k-means clustering algorithm, the processor does not re-compute cluster membership for the UAVs in the seed data set, thus guiding the clustering process and preventing completely random clusters. The net outcome of the semi-supervised clustering is a set of clusters that are defined by the goal characteristics. As an example, cluster 1 is all UAVs with characteristics lying in the goal of 0-100 miles and a thrust/weight ratio of 3:1, whereas cluster 2 is all UAVs with characteristics lying in the goal of 100-200 miles and a thrust/weight ratio of 3:1, and so on.

When a new goal specification is stated (a delivery assignment arises), an appropriate cluster is found and a UAV is picked from the cluster for the package delivery task. After each delivery, the goal is evaluated for completion. In embodiments, the evaluation is based on negative feedback such as the UAV crashing, running out of battery, or taking too much time to complete the task (a possible indication that the UAV is not powerful enough to effectively overcome a headwind, for example). The clusters are re-computed after updating the UAV's goal characteristics based on the evaluation. For example, re-computing may result in the UAV being placed in a cluster having a shorter distance characteristic. Based on this, in embodiments, a UAV is assigned a more appropriate cluster, which has the effect of potentially altering the clustering for future/new UAV assignments and making them more accurate.

In embodiments, after the total number deliveries with positive feedback (such as a successfully completed delivery) exceeds a predefined threshold, the delivery destinations are sorted by most visited to least visited and their corresponding goal specifications are determined, then the clusters with the above goal specifications are analyzed to figure out if the cluster needs additional UAVs or if a nearby/similar cluster can be merged with the cluster to have additional UAVs available for frequently visited paths.

In embodiments, after the total number of failed deliveries exceeds a predefined threshold, the processor analyzes the flight trajectory, energy consumption and knowledge of weather patterns along the paths taken for statistical significance to evaluate if weather played a role in the delivery failure. If weather influenced the delivery failure, the processor determines if additional UAVs can assist in covering such future deliveries. If weather did not influence the delivery failure, then the processor analyzes the flight path versus UAV characteristics to determine if a different cluster should be picked for covering that particular delivery goal.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
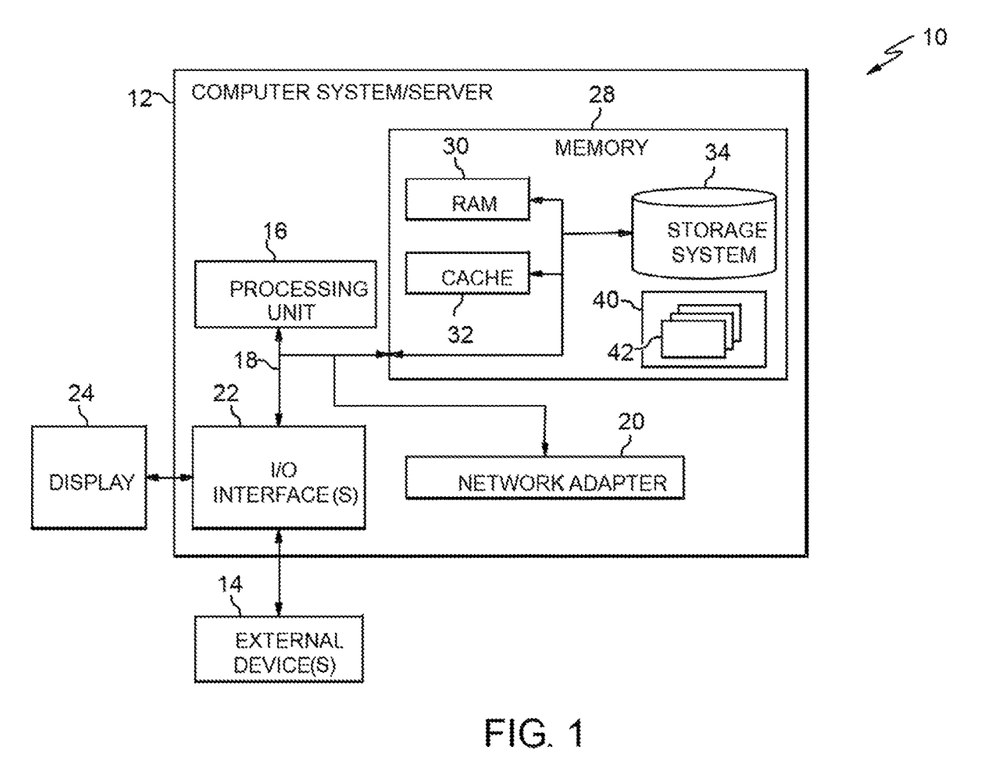
FIG. 1 depicts a computer infrastructure according to an embodiment of the present invention.

Referring now to FIG. 1, a schematic of an example of a computer infrastructure is shown. Computer infrastructure 10 is only one example of a suitable computer infrastructure and is not intended to suggest any limitation as to the scope of use or functionality of embodiments of the invention described herein. Regardless, computer infrastructure 10 is capable of being implemented and/or performing any of the functionality set forth hereinabove.

In computer infrastructure 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computer infrastructure 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
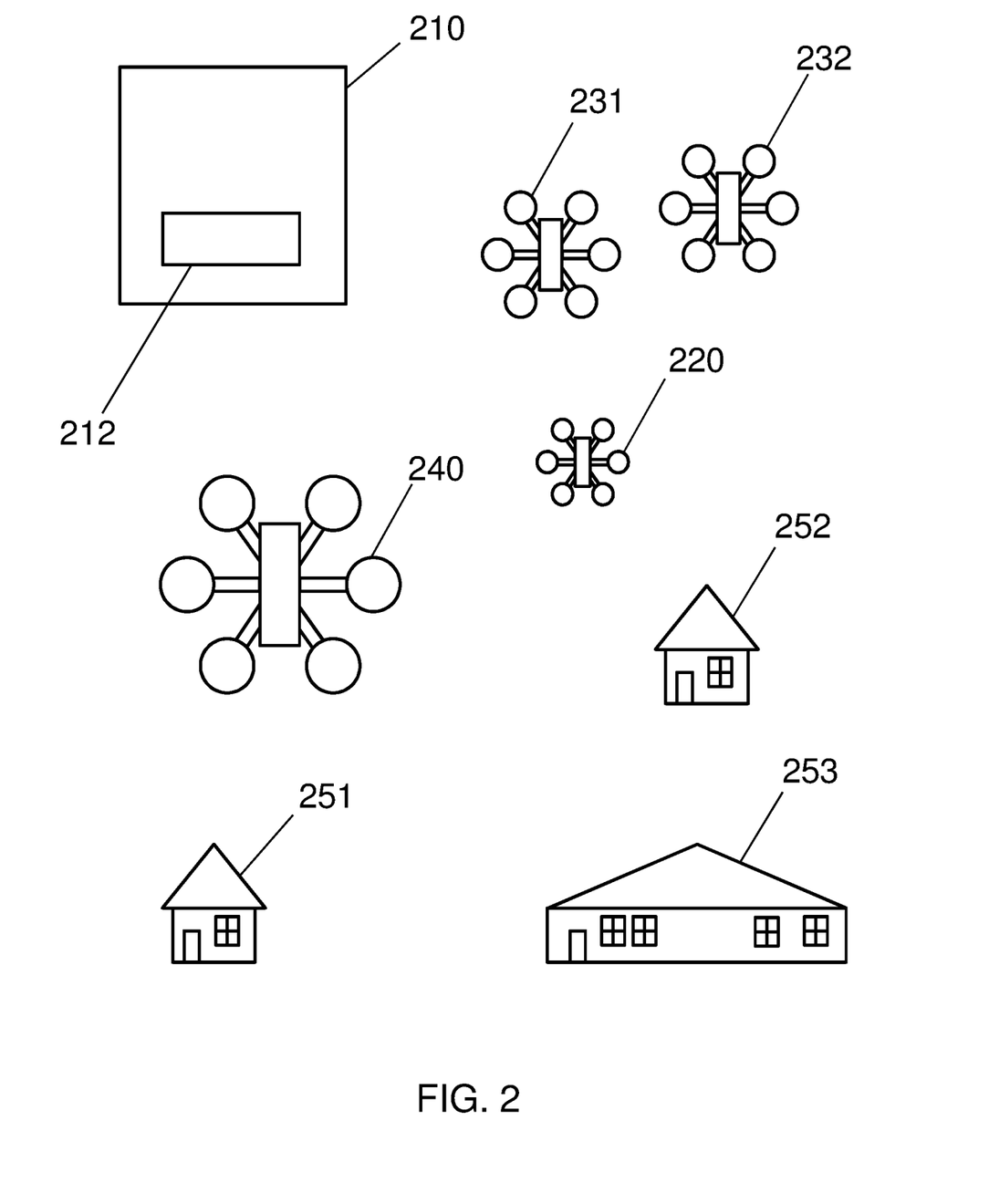
FIG. 2 shows a block diagram of an exemplary environment in accordance with aspects of the invention.

FIG. 2 shows a block diagram of an exemplary environment in accordance with aspects of the invention. In embodiments, the environment includes a computing device 210 such as, for example, computer system 12, that contains a module (or modules) 212 that perform the steps of embodiments of the invention. The environment also includes a number of UAVs of different sizes, powers, and capabilities represented by a small UAV 220, medium UAVs 231, 232, and a large UAV 240. Although size is the only difference in the schematic representations of the UAVs in FIG. 2, it is noted that some UAVs in the environment differ in one or more of the following UAV characteristics: frame size, weight, number of rotors, rotor orientation, number of blades, blade pitch, propeller diameter, battery type, battery size, maximum battery discharge capability, controller type, motor manufacturer type, motor cooling capability, and gear ratio. These and other differences result in different ones of the UAVs having different delivery, or other task, capabilities. For example, some of the UAVs are more suited for long delivery distances with a particular weight or size package, where other ones of the UAVs are more suited to shorter delivery distances with the same or different weight or size package. The environment also includes multiple delivery locations which are represented in FIG. 2 by delivery locations 251, 252, 253 which represent residential, commercial, municipal, and other delivery locations. Although only three delivery locations are shown in FIG. 2, embodiments of the invention include fewer or more than three delivery locations. In embodiments, computing device 210 communicates with a UAV, for example UAV 220, through a wired or wireless connection before each task to program the delivery location, initial route, and any other information such as, for example, projected weather/wind conditions, delivery time constraints, and/or speed limitations, into the UAV.

In embodiments, computing device 210 communicates with a UAV, for example UAV 220, through a wired or wireless connection after each task to download from the UAV to computing device 210 feedback information regarding the UAV's performance relative to the task. In embodiments, computing device 210 communicates with a UAV, for example UAV 220, through a wireless connection during the task so that computing device 210 can transmit, for example, instructions to cancel the delivery, instructions to change the route, instructions to change the delivery location, or other instructions. In embodiments, computing device 210 communicates with the UAV through a wireless connection during the task to relay other information relevant to the task such as, for example, weather/wind conditions that the UAV uses to modify the task. For example, some UAVs have the ability to modify the route, their flight speed, or other flight parameters in order to adapt to changing weather and/or other conditions and use this information in that regard. In embodiments, a UAV, for example UAV 220, communicates with computing device 210, through a wireless connection during the task to relay pertinent information to computing device 210 such as, for example, revised delivery time, and/or UAV condition (for example, battery condition, motor function, motor temperature, or stability control function).

Figure 3:
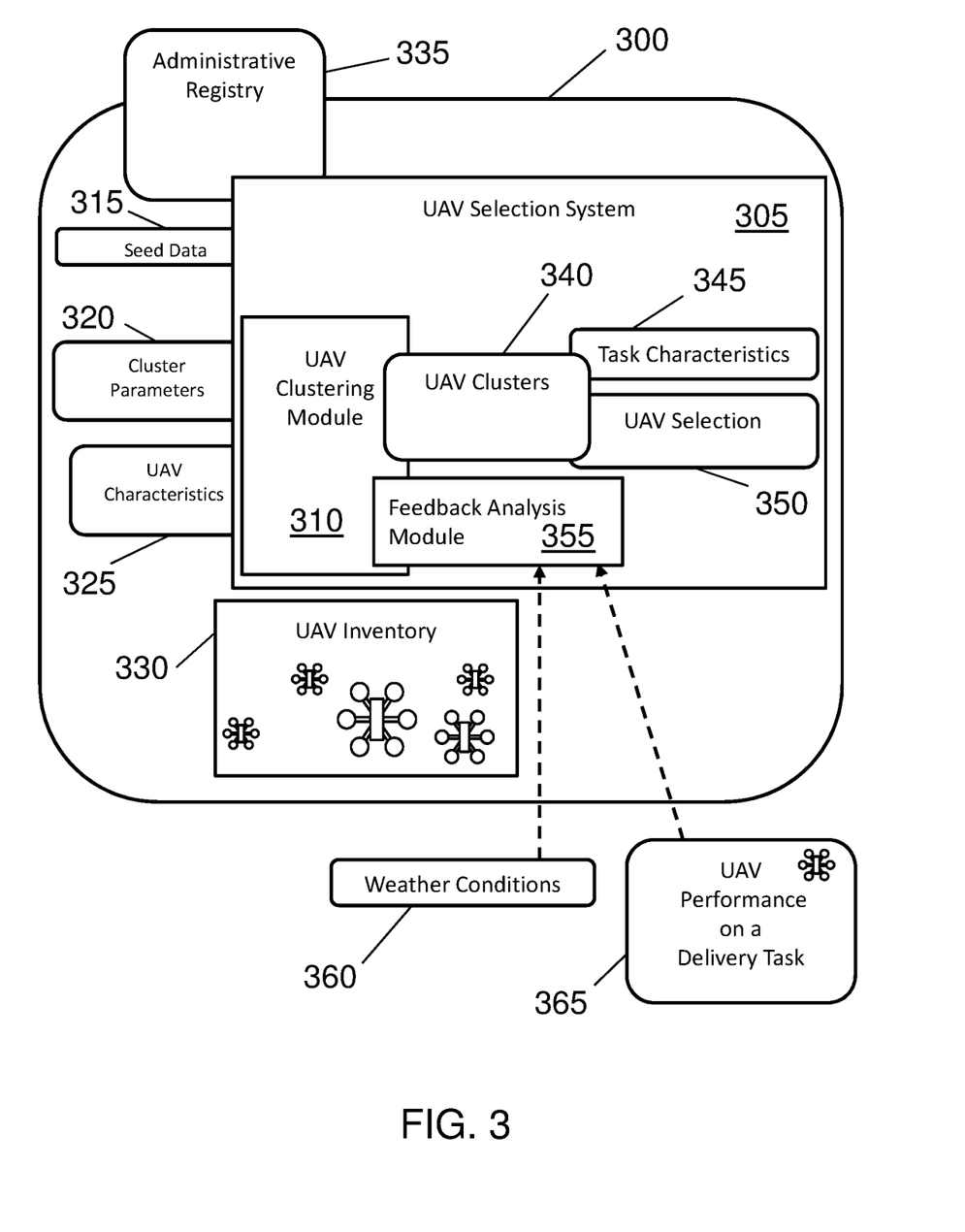
FIG. 3 shows a block diagram of an exemplary system in accordance with aspects of the invention.

FIG. 3 shows a schematic representation of an embodiment of the invention. In FIG. 3, a UAV delivery enterprise 300 is used to explain various features of embodiments. While a delivery system is used in this example, it is noted that embodiments of the invention include other systems and methods using UAVs of differing capabilities to perform a function or functions.

Figure 4:
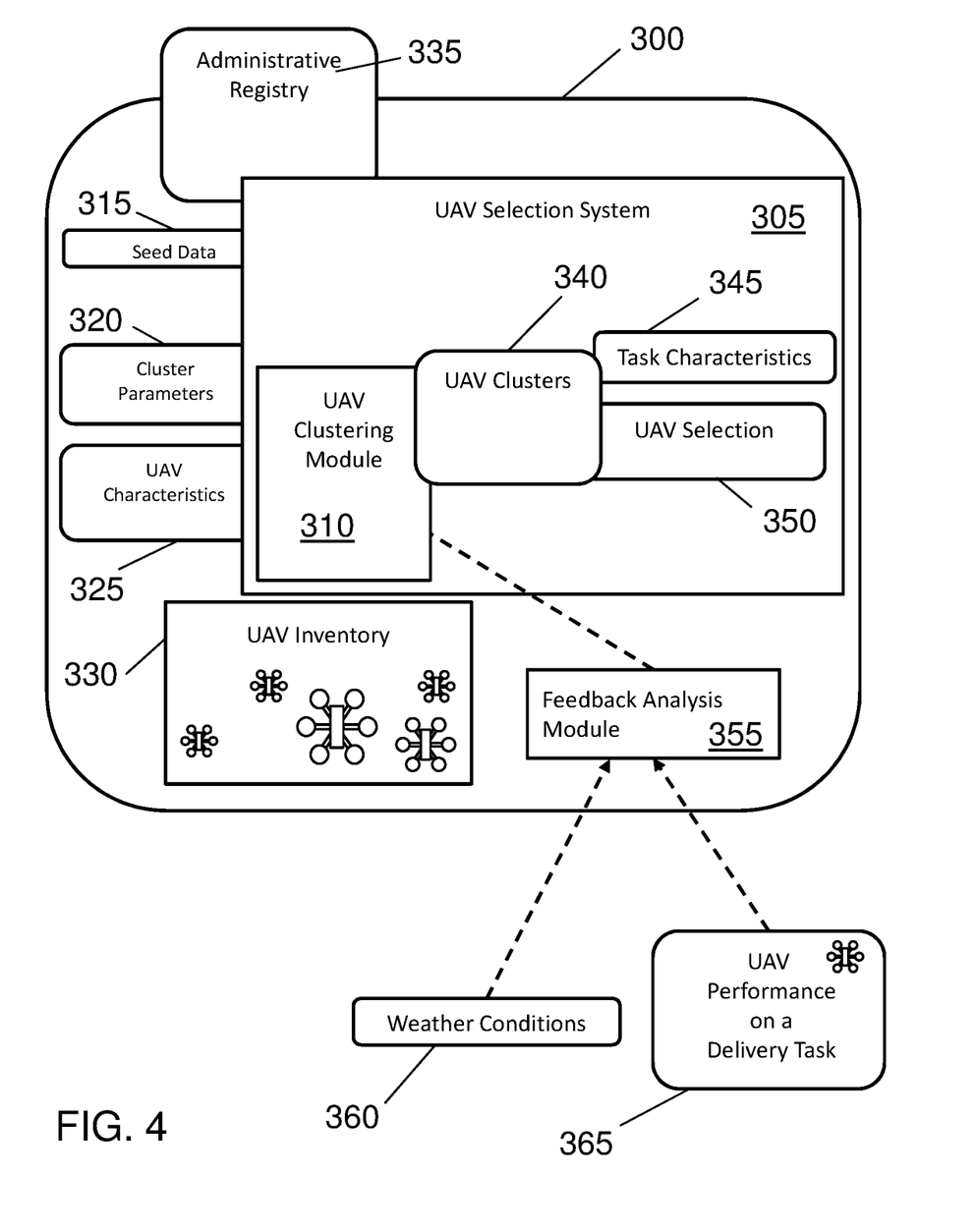
FIG. 4 shows a block diagram of an exemplary system in accordance with aspects of the invention.

UAV delivery enterprise 300, in this example, includes a UAV selection system 305 (in this example, including a UAV clustering module 310 and a feedback analysis module 355), and a UAV inventory 330 such as, for example, UAVs 220, 231, 232, 240 in FIG. 2. Although UAV clustering module 310 and feedback analysis module 355 are shown as two separate modules in this example, in other embodiments UAV clustering module 310 and feedback analysis module 355 are one module that performs the functions of both UAV clustering module 310 and feedback analysis module 355. In embodiments, feedback analysis module 355 is located remotely from UAV clustering module 310, as shown in FIG. 4. For example, in embodiments, feedback analysis module 355 is located in a UAV base where the plurality of UAVs (or a portion of the plurality of UAVs) are located while UAV clustering module 310 is located in an office space remote from the UAV base.

UAV selection system 305, which is computing device 210 in embodiments, uses information from various sources to select an available UAV from UAV inventory 330 for a particular task, which is a package delivery in this example. UAV clustering module 310 generates a new data set in the form of a plurality of UAV clusters 340 from the UAVs in UAV inventory 330. In embodiments, as described above, the cluster generation is performed using a combination of k-means clustering and supervised learning to group the UAVs into a plurality of UAV clusters 340 based on unlabeled data (UAV characteristics 325) and labeled data (UAV and goal characteristics) to guide the sorting process. Examples of UAV characteristics include frame size, weight, number of rotors, rotor orientation, number of blades, blade pitch, propeller diameter, battery type, battery size, maximum battery discharge capability, controller type, motor manufacturer type, motor cooling capability, and gear ratio. Each cluster of the plurality of clusters 340 will, as a result, have a set of cluster parameters 320 that generally define the UAVs in that cluster. In embodiments, cluster parameters 320 are defined by the sorting method (in this example by the k-means clustering algorithm) and are not known until the sorting (and thus cluster formation) is complete. Cluster parameters 320 of each cluster are not known until the generating is complete because the particular cluster parameters of any one cluster are dependent on UAVs being sorted. However, because the cluster generation is semi supervised (by using seed data), completely random clustering is avoided. The result of the cluster generation is that UAVs that fall within the cluster parameters 320 of a particular cluster will be similar in their capabilities.

In this example, the initial clustering is performed using seed data 315. In this example, seed data 315 is prepared by calculating expected flight distance and thrust-weight ratio by considering the UAV characteristics 325 of each of the UAVs in a sub-set of UAV inventory 330. The UAVs of the sub-set are then used as seed data in the k-means clustering algorithm during the initial seeding step. The UAVs in UAV inventory 330 that are not in the initial seeding step are then associated with clusters following usual k-means clustering. In subsequent steps of the k-means clustering algorithm, cluster membership of the seed data UAVs is not recomputed, thus guiding the clustering process and preventing completely random clusters.

In some embodiments, no seed data 315 is used in the initial clustering. In embodiments that include no seed data 315, the clusters are randomly generated and then the UAVs are re-sorted and/or new clusters are generated as a result of feedback data after tasks are attempted (discussed in detail below).

After initial cluster generation is completed and UAV inventory 330 is divided into a number of UAV clusters 340, tasks (in this example, deliveries) are attempted. Task characteristics 345 are received by UAV selection system 305 that define the particular delivery. In embodiments, task characteristics 345 are received from an operator of UAV delivery enterprise 300, or a customer (for example an online customer) that has ordered the package being delivered. In embodiments, the operator of UAV delivery enterprise 300 is an online or other retailer that receives orders from customers and uses UAV delivery enterprise 300 to deliver to the customers packages that fulfil the orders. In other embodiments, the operator of UAV delivery enterprise 300 is a delivery company that delivers packages for online or other retailers. In embodiments, task characteristics 345 include the weight of the package and the distance of the delivery location from the UAV's current location. In embodiments, task characteristics 345 also include wind patterns (current and/or historical), other weather conditions (current and/or historical), no-fly zones, and/or any other condition or information regarding the delivery that can impact the UAV's performance or ability to successfully complete the delivery. UAV selection system 305 determines which UAV cluster 340 should be used to attempt the delivery based on the cluster parameters 320 of each UAV cluster 340. The UAV cluster 340 is chosen that has cluster parameters 320 that include the task characteristics 345 of the particular delivery. For example, for a delivery of a package that weighs 20 pounds and is a 30 mile round trip, a UAV cluster 340 that has cluster parameters 320 of 0 to 50 miles and a thrust/weight ratio of 3:1 is selected. After the appropriate UAV cluster 340 is selected, a random one of the UAVs in that UAV cluster is selected (represented by UAV selection 350) and assigned to the delivery by UAV selection system 305 sending a communication to the selected UAV. In embodiments, the communication sent to the selected UAV by UAV selection system 305 includes delivery instructions such as, for example, delivery location, package weight, route, maximum and/or minimum speed, and/or expected weather/wind conditions.

After the selected UAV completes its attempt at the delivery, UAV performance on the delivery task 365 is transferred to feedback analysis module 355 as feedback. In embodiments, the feedback is transferred from the UAV to feedback analysis module 355 by a wireless link. In other embodiments, the feedback is transferred from the UAV to feedback analysis module 355 by a wired connection such as, for example, a wire from feedback analysis module 355 that plugs into the UAV. In this example, successfully completing a delivery attempt includes both delivering the package and safely returning to the planned finishing location (such as a UAV base). In embodiments, the feedback includes whether or not the delivery was successfully completed and, if the delivery was not successfully completed, why it was not successfully completed. In embodiments, feedback concerning an unsuccessful delivery attempt includes whether or not the UAV crashed, and whether or not the UAV's battery was discharged to the point that the UAV could not complete the delivery. In embodiments, weather conditions 360 relevant to the delivery attempt are also sent to (or obtained by) feedback analysis module 355. In embodiments, weather conditions 360 obtained by feedback analysis module 355 are weather conditions sensed by the UAV during the task and are downloaded from the UAV and/or weather conditions received by feedback analysis module 355 (or the UAVs) from a third-party weather information provider. In embodiments, feedback analysis module 355 determines, based on information from UAV performance on the delivery task 365 and (in some embodiments) weather conditions 360, whether the particular UAV still meets the criteria of its current UAV cluster 340. If feedback analysis module 355 determines that the particular UAV no longer meets the criteria of its current UAV cluster 340, that information is sent to UAV clustering module 310 and used in the next reclustering step.

In embodiments, feedback analysis module 355 analyzes the reason why the delivery was unsuccessful. For example, feedback analysis module 355 considers, for example, wind speed, rotor orientation, motor cooling, and/or any other weather condition 360, route characteristic, or UAV characteristic 325 to determine whether or not the particular UAV is suited for that particular route, distance, and/or package. In some instances, it is determined that that particular UAV no longer meets the cluster parameters 320 of its current UAV cluster 340 and therefore should be reassigned to a different cluster 340.

In embodiments, feedback analysis module 355 analyses UAV characteristics 325, route characteristics, and weather conditions 360 from a successful delivery to determine if the particular UAV still meets the criteria of its current UAV cluster 340. For example, if the UAV successfully completes the delivery with 50% of its battery life, then the UAV may be better utilized in another cluster (for example, one with longer flight distances).

The results of the analysis by feedback analysis module 355 are used by UAV clustering module 310 during subsequent reclustering (in this example, during subsequent steps of k-means clustering). Reclustering based on feedback results in repeated refining of the cluster parameters 320 that define UAV clusters 340, and in which UAVs of UAV inventory 330 belong to each UAV cluster 340. This refining results in a more appropriate UAV being assigned to each delivery.

In embodiments, feedback from successful deliveries is not used in reclustering unless and until a certain number of (for example, five) successful deliveries are completed by the particular UAV. This helps prevent one successful delivery in which the UAV was not efficiently used from causing the UAV to be moved to a different (for example, more demanding) UAV cluster 340.

In embodiments, feedback from an unsuccessful delivery attempt, or a predetermined number of unsuccessful delivery attempts, can indicate a UAV that should be removed from service for repairs or permanently. For example, a UAV may need its battery replaced if an unsuccessful delivery attempt was unsuccessful due to the UAV's battery failing as a result of the battery being at the end of its useful life.

The administrative registry 335 in FIG. 3 represents information regarding the UAVs in UAV inventory 330 that is required to be registered with the any associated government or other agency (for example the US FAA), and also represents rules and regulations regarding UAV use. In embodiments, the rules and regulations regarding UAV use are considered by UAV selection system 305 when, for example, a cluster is selected for a particular task. For example, flight elevation minimums and maximums and no-fly zones can be relevant to cluster selection because they can increase the distance that must be traveled for a particular delivery. Also, weight limitations can be relevant to cluster selection because the UAVs in a particular cluster may be too heavy to carry a particular package without violating the rules and regulations regarding maximum combined weight of a UAV and the package being carried by the UAV.

Figure 5:
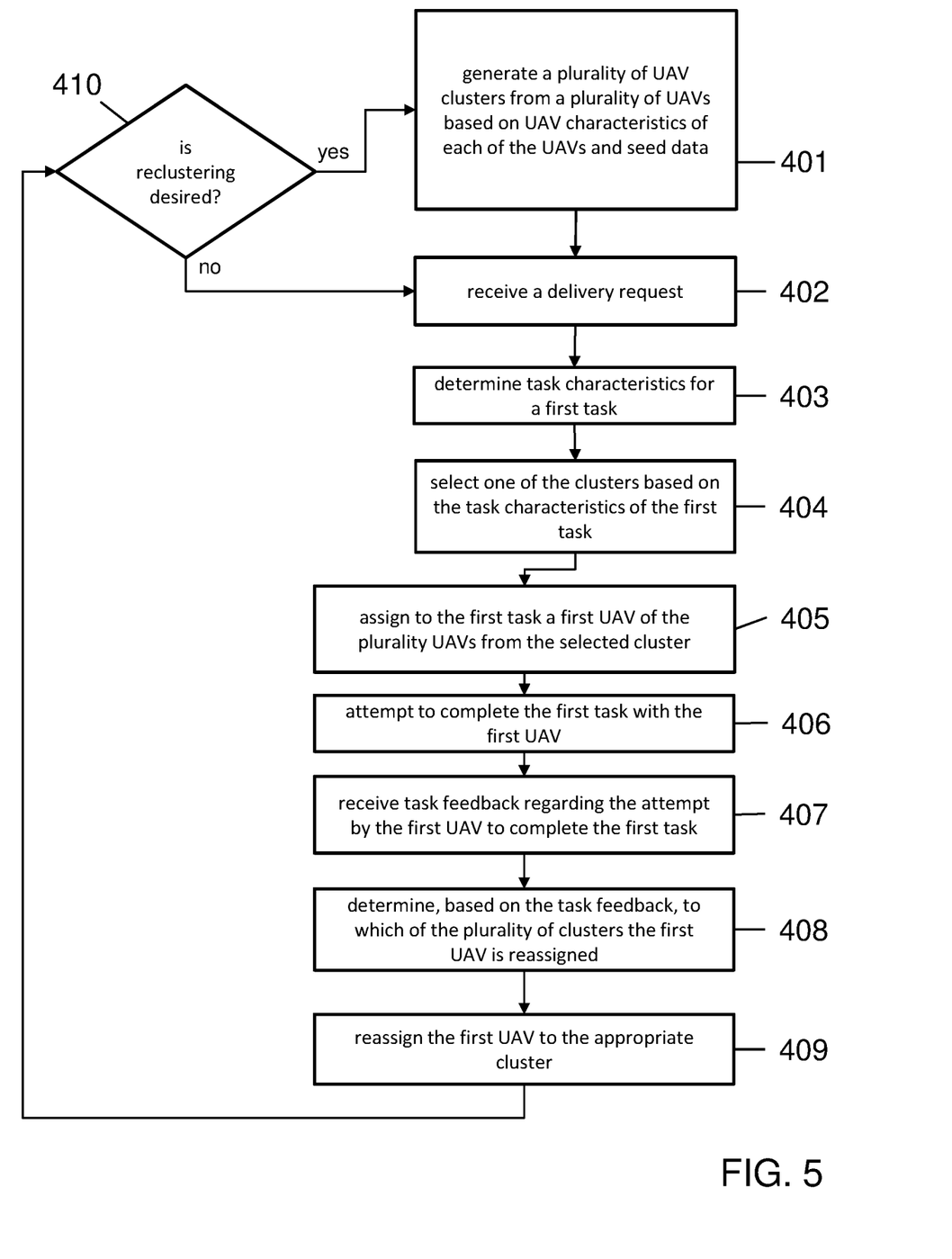
FIG. 5 shows a flowchart of an exemplary method in accordance with aspects of the invention.

FIG. 5 shows a flowchart of an exemplary method in accordance with aspects of the present invention. Steps of the method may be carried out in the environment of FIG. 2 and are described with reference to elements depicted in FIGS. 3 and 4.

At step 401, the system, for example, UAV selection system 305, generates a plurality of UAV clusters, such as UAV clusters 340, from a plurality of UAVs, such as UAV inventory 330, based on UAV characteristics 325 of each of the UAVs and, in some embodiments, seed data 315. At step 402, UAV selection system 305, for example, receives a delivery request. At step 403, UAV selection system 305, for example, determines task characteristics 345 for the delivery request. At step 404, UAV selection system 305, for example, selects one of the clusters, such as one of UAV clusters 340, based on task characteristics 345 of the first task. At step 405, UAV selection system 305, for example, assigns a first UAV from the selected cluster, such as the selected UAV cluster 340, to the first task. At step 406, the first UAV attempts the first task. At step 407, feedback analysis module 355, for example, receives task feedback, such as UAV performance on a delivery task 365, regarding the attempt by the first UAV to complete the first task. At step 408, UAV clustering module 310, for example, determines, based on the task feedback, to which of the plurality of clusters the first UAV should be reassigned. At step 409, UAV clustering module 310, for example, reassigns the first UAV to the appropriate cluster, which can be the cluster it is currently assigned to or another cluster. At step 410, UAV clustering module 310, for example, determines whether reclustering is desired. If reclustering is desired, processing proceeds to step 401. If reclustering is not desired, processing proceeds to step 402 where UAV selection system 305, for example, receives another deliver request.

Embodiments include a method for clustering UAVs in a UAV fleet for optimal goal completion. The method includes: receiving identifying information for a fleet of UAVs, the UAVs each including a plurality of UAV characteristics; receiving a set of goal characteristics, the goal characteristics including flight distances and thrust weight ratios for using UAVs to deliver packages; identifying a subset of UAVs of the fleet, and calculating expected flight distances and thrust weight ratios for the UAVs of the subset based on their respective UAV characteristics; performing semi-supervised clustering to categorize the UAVs into clusters based on goal characteristics, the clustering including annotating the UAVs of the subset with their respectively calculated flight distances and thrust weight ratios, and the clustering further including using k-means clustering to associate UAVs not in the subset with the nearest annotated cluster; and, in response to receiving a request to deliver a package, selecting a UAV from a cluster corresponding to a delivery goal for the package.

In embodiments, positive and negative feedback is captured on whether the selected UAV met the delivery goal, and used to refine the clusters.

In embodiments, the UAV characteristics include number of rotors, weight, frame size, rotor orientation, battery type, battery state, max discharge percentage, controller type, motor manufacturer type, motor cooling quality, gear ratio, propeller diameter, pitch, and number of blades.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/ or the service provider can receive payment from the sale of advertising content to one or more third parties.

In still additional embodiments, the invention provides a computer-implemented method, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
generating, by a computer device, a plurality of clusters of unmanned aerial vehicles (UAVs) from a plurality of UAVs having different UAV characteristics, wherein the plurality of clusters are generated based on the UAV characteristics of each of the plurality of UAVs, and each cluster of the plurality of clusters has a set of cluster parameters;
determining, by the computer device, task characteristics for a first task;
selecting, by the computer device, one cluster of the plurality of clusters based on the task characteristics of the first task being within the set of cluster parameters of the selected cluster;
assigning to the first task, by the computer device, a first UAV of the plurality of UAVs from the selected cluster;
sending the first task, by the computer device, to the first UAV in an attempt by the first UAV to complete the first task;
receiving, by the computer device, task feedback regarding the attempt by the first UAV to complete the first task;
refining the set of cluster parameters of the selected cluster, by the computer device, based on the task feedback; and
reassigning, by the computer device, and based on the refined set of cluster parameters, the first UAV to a different cluster of the plurality of clusters.

2. The method of claim 1, wherein the set of cluster parameters include a range of task distance and a UAV thrust-weight ratio.

3. The method of claim 1, wherein the generating is additionally based on seed data, the seed data being at least partially calculated from the UAV characteristics of a seed data set of UAVs that are a subset of the plurality of UAVs.

4. The method of claim 1, wherein the task feedback includes information that the first UAV did not successfully complete the first task.

5. The method of claim 4, wherein the task feedback includes a reason why the first UAV did not successfully complete the first task.

6. The method of claim 1, wherein the computer device receives the task feedback from the first UAV.

7. The method of claim 1, wherein the computer device receives the task feedback from a feedback analysis module.

8. The method of claim 7, wherein the feedback analysis module is located remotely from the computing device.

9. The method of claim 1, wherein a service provider provides a service, and the service is selected from the group consisting of creating, maintaining, deploying and supporting the computer device.

10. The method of claim 1, wherein the computer device and the plurality of UAVs are provided by a service provider on a subscription, advertising, and/or fee basis.

11. A computer program product, the computer program product comprising a non-transitory computer readable storage medium having program instructions embodied therewith, the program instructions executable by a computing device to cause the computing device to:
generate a plurality of clusters of unmanned aerial vehicles (UAVs) from a plurality of UAVs, each cluster of the plurality of clusters having a set of cluster parameters;

determine task characteristics for a first task;
select one cluster of the plurality of clusters based on the task characteristics of the first task being within the set of cluster parameters of the selected cluster;
assign to the first task a first UAV of the plurality of UAVs from the selected cluster;
send the first task to the first UAV in an attempt by the first UAV to complete the first task;
receive task feedback regarding the attempt by the first UAV to complete the task;
refine the set of cluster parameters of the selected cluster based on the task feedback; and
reassign, based on the refined set of cluster parameters, the first UAV to a different cluster of the plurality of clusters.

12. The computer program product of claim 11, the program instructions causing the generating by the computing device of the plurality of clusters to be based on UAV characteristics of each of the plurality of UAVs.

13. The computer program product of claim 12, the program instructions further causing the computing device to add a new UAV that is not one of the plurality of UAVs to one of the plurality of clusters based on UAV characteristics of the new UAV.

14. The computer program product of claim 13, the program instructions causing the computing device to revise the UAV characteristics of the first UAV based on the task feedback.

15. The computer program product of claim 14, wherein the UAV characteristics of the first UAV include a number of rotors, a UAV weight, a frame size, a rotor orientation, a battery type, a battery charge level, a maximum allowable battery discharge percentage, a controller type, a motor manufacturer type, a motor cooling level, a gear ratio, a propeller diameter, a propeller pitch, and a number of blades on a propeller.

16. The computer program product of claim 12, the program instructions further causing the computing device to generate the plurality of clusters using a k-means clustering algorithm.

17. A system comprising:
a processor, a computer readable memory, and a computer readable storage medium storing program instructions, the processor configured to execute the program instructions to:
generate, by the processor, a plurality of original clusters of unmanned aerial vehicles (UAVs) from a plurality of UAVs having different UAV characteristics, the plurality of original clusters being generated based on the UAV characteristics of each of the plurality of UAVs, each of the plurality of original clusters having a set of cluster parameters;
select one original cluster of the plurality of original clusters based on task characteristics of a first task being within the set cluster parameters of the selected original cluster;
assign to the first task a first UAV of the plurality of UAVs from the selected original cluster;
send the first task to the first UAV in an attempt by the first UAV to complete the first task;
receive task feedback regarding an attempt by the first UAV to complete the task;
refine the set of cluster parameters of the selected original cluster based on the task feedback;
reassign, based on the refined set of cluster parameters, the first UAV to a different cluster of the plurality of original clusters; and
generate a plurality of new clusters of UAVs from the plurality of UAVs based on the task feedback.

18. The system of claim 17, wherein the program instructions to generate the plurality of new clusters include combining two original clusters of the original plurality of clusters into one of the plurality of new clusters.

19. The system of claim 17, wherein at least one of the plurality of new clusters has cluster parameters that are different than the cluster parameters of all of the plurality of original clusters.

* * * * *